United States Patent [19]

Ogasawara et al.

[11] Patent Number: 5,108,659
[45] Date of Patent: Apr. 28, 1992

[54] SINTERED BODY OF CONDUCTIVE SIALON AND HEATING ELEMENT MADE THEREOF

[75] Inventors: Sachio Ogasawara; Seiji Okazaki; Kenji Maruta, all of Kumagaya, Japan

[73] Assignee: Hitachi Metals, Ltd., Tokyo, Japan

[21] Appl. No.: 707,172

[22] PCT Filed: Jan. 26, 1989

[86] PCT No.: PCT/JP89/00072
§ 371 Date: Sep. 12, 1989
§ 102(e) Date: Sep. 12, 1989

[87] PCT Pub. No.: WO89/07092
PCT Pub. Date: Aug. 10, 1989

Related U.S. Application Data

[63] Continuation of Ser. No. 415,217, Sep. 12, 1989, abandoned.

[30] Foreign Application Priority Data

Jan. 28, 1988 [JP] Japan ............................ 63-17587

[51] Int. Cl.⁵ .............................................. C04B 35/58
[52] U.S. Cl. .................................... 252/520; 252/521; 501/97; 501/98; 219/553
[58] Field of Search ................ 501/97, 98; 252/520, 252/521; 219/553

[56] References Cited

U.S. PATENT DOCUMENTS

| | | |
|---|---|---|
| 4,528,121 | 7/1985 | Matsushita et al. ............ 501/98 X |
| 4,547,470 | 10/1985 | Tanase et al. .................. 501/98 X |
| 4,613,455 | 9/1986 | Suzuki et al. .................. 252/520 X |
| 4,810,853 | 3/1989 | Maruta et al. .................. 219/270 |
| 4,923,829 | 5/1990 | Yasutomi et al. ............... 501/98 X |
| 4,931,619 | 6/1990 | Ogata et al. ................... 219/553 X |
| 4,935,389 | 6/1990 | Umebayashi et al. ............ 501/98 |

*Primary Examiner*—Karl Group
*Attorney, Agent, or Firm*—Wenderoth, Lind & Ponack

[57] ABSTRACT

This invention relates to a sintered body of conductive sialon and a heater element made of this sintered body. They are relieved from damage by partial expansion without any adverse effect on mechanical strength and electrical properties. According to this invention, the thickness of the oxidation layer in the sintered bodies is controlled. Thus the sintered body of sialon pertaining to this invention is formed by sintering a mixture composed of a base mixture containing $Si_3N_4$ (major constituent), a small amount of AlN (polytype), and less than 5 wt % of $Y_2O_3$, and a small amount of $Al_2O_3$ and 23–70 vol % (based on the base mixture) of at least one kind of Ti carbide, Ti nitride, and Ti carbonitride.

1 Claim, 3 Drawing Sheets

SINTERED BODY OF CONDUCTIVE SIALON AND HEATING ELEMENT MADE THEREOF

This application is a continuation of now abandoned application Ser. No. 07/415,217 filed Sep. 12, 1989 now abandoned.

TECHNICAL FIELD

The present invention relates to a sintered body of conductive sialon and a heating element made thereof, said sintered body being relieved from breakage by expansion that occurs at a specific part during use at high temperatures, and hence having improved durability.

BACKGROUND ART

Sintered bodies of $\beta$-type sialon find use in varied application areas on account of their advantages such as high strengths at high temperatures, superior oxidation resistance, small coefficients of thermal expansion, and great thermal-shock resistance.

There is proposed a sialon containing 0.2–10 wt % of $Y_2O_3$ and 10–40 wt % of TiN, which is intended to make a sintered body for cutting tools. (See Japanese Patent Laid-open No. 213678/1983.) There is also proposed a sialon containing 0.2–10 wt % of $Y_2O_3$, 0.5–10 wt % of $ZrO_2$, and 10–30 wt % of TiN, which is intended for the same application as above. (See Japanese Patent Laid-open No. 3073/1984.) These sialons contain TiN and 0.2–10 wt % of $Y_2O_3$, which add high toughness and high hardness to the sialon sintered bodies which are used for cutting tools on account of their superior oxidation resistance and thermal-shock resistance. However, sialon sintered bodies containing $Y_2O_3$ suffer from expansion and cracking at high temperatures (about 850° C.). This is not disclosed in the above-cited literature.

A sintered body of sialon can be used as a heater element as disclosed in Japanese Patent Laid-open No. 33265/1985 filed by the present assignee. It is composed of 30–70 vol % of $Si_3N_4$, 30–70 vol % of TiN (to impart conductivity), and 1–10 wt % of $Al_2O_3$, $Y_2O_3$, and MgO or AlN or both. It has a resistivity lower than $10^{-2}$ $\Omega$·cm at room temperature and a positive resistance-temperature coefficient. It contains 1–10 wt % of $Al_2O_3$, $Y_2O_3$, and MgO or AlN or both, which function as sintering auxiliaries, so that it has increased strength at 1000° C. and above, and it also has a positive resistance-temperature coefficient. Nevertheless, nothing is taken into account about the formation and prevention of an oxide layer at high temperatures (about 850° C.). In the meantime, Japanese Patent Laid-open No. 17264/1988 filed by the present assignee discloses a sintered body composed of 30–75 vol % of $\beta$-sialon phase, 25–70 vol % of conductive oxide, nitride, and carbide phases, and a grain boundary phase of $Y_2O_3$. This sintered body requires that the conductive phase should have a specific particle diameter, so that it has good electrodischarge machinability, oxidation resistance, and thermalshock resistance. Nevertheless, nothing is mentioned about the fact that $Y_2O_3$ is associated with the expansion and cracking that occur in the sintered body at high temperatures in the neighborhood of 850° C.

There is disclosed a ceramics sintered body similar to a sialon sintered body in Japanese Patent Laid-open No. 41771/1983. It is composed of $Si_3N_4$ powder, 0.05–5 vol % of one or more members of $Y_2O_3$, $Al_2O_3$, etc. as a sintering auxiliary, and 1–25 vol % of one or more kinds of Ti carbonitrides and the like impart the conductivity. This composition is intended to improve the electrical conductivity of the grain boundary layer, thereby improving the electrical conductivity of the entire sintered body and imparting electrical conductivity to the sintered body.

There is proposed a ceramics heater element of a sintered body composed of $Si_3N_4$ (major constituent), 2.9–51.5 vol % of TiN, and 3.5–15 mol % of $Y_2O_3$, MgO, $Al_2O_3$, and $SiO_2$. (See Japanese Patent Laid-open No. 60983/1985.) This sintered body is intended to have high strength, thermal-shock resistance and heat resistance at high temperatures in the neighborhood of 1200° C.; however, nothing is disclosed about the function and effect which are produced by specifying the content of $Y_2O_3$ as the sintering auxiliary.

DISCLOSURE OF THE INVENTION

The present inventors carried out a series of experiments with heater elements which were made of their previously proposed conductive sialon sintered body as a heating means. In the course of these experiments, it was found that the heater element suffers expansion in a part thereof (as shown in FIG. 2 which is a fragmentary sectional view of the sintered body) when it is induced to generate heat by the application of voltage. This expansion leads to a crack parallel to the surface (as indicated by A in FIG. 2). In the worst case, the crack runs in the direction perpendicular to the surface; it cuts off the electrical conductivity and disables the heater element.

The present invention was completed to eliminate this shortcoming. Accordingly, it is an object of the present invention to provide a durable sintered body of conductive sialon which does not suffer expansion even when it is used at high temperatures.

In order to clear up the cause of expansion in a sintered body of conductive sialon, the present inventors carried out a series of research efforts, which led to the finding that expansion is related to the thickness of the oxidation layer formed in the sintered body. This relation was investigated by the following experiment. A sintered body of conductive sialon was prepared from a mixture composed of a base mixture containing $Si_3N_4$ (major constituent), a small amount of AlN (polytype), and 7 wt % of $Y_2O_3$, and a small amount of $Al_2O_3$ and 30 vol % (based on the base mixture) of at least one kind of Ti carbide, Ti nitride, and Ti carbonitride. The sintered body measured 20 mm long, 2.6 mm wide, and a 1.5 mm thick. Upon application of voltage (5 V), the sintered body became hot, with the temperature being highest at the center and gradually declining towards the ends. About 30 seconds after the voltage application, the sintered body reached an equilibrium, with the center being at about 1020° C. and the ends being at about 700° C. Expansion occurred at a specific place about several millimeters away from the center. These results suggest a close relation between expansion and temperature.

For further investigation, the sintered body of conductive sialon was examined for change in structure which occurs when the sintered body is heated at varied temperatures in an electric furnace. These results revealed that there is a relationship between the heating temperature and the thickness of the oxidation layer, as shown in FIG. 4. It is noted that the thickest oxidation layer occurs when the heating temperature is about 850° C. The above data suggest that expansion is liable to occur at a specific place where there is a thick oxidation layer. In other words, it was found that it is important to control the thickness of the oxidation layer in order to prevent expansion.

It is an object of the present invention to provide a sintered body of conductive sialon which does not suffer expansion. The first aspect of the present invention resides in a sintered body of conductive sialon which is formed by sintering a mixture composed of a base mixture containing $Si_3N_4$ (major constituent), a small amount of AlN (polytype), and less than 5 wt % of $Y_2O_3$, and a small amount of $Al_2O_3$ and 23-70 vol % (based on the base mixture) of at least one kind of Ti carbide, Ti nitride, and Ti carbonitride. The second aspect of the present invention resides in a heater element formed by attaching electrodes to said sintered body in a proper shape.

According to the present invention, the sintered body contains at lest one kind of Ti carbide, Ti nitride, and Ti carbonitride as conductive substance. The reason for this is that Ti carbide, Ti nitride, and Ti carbonitride are most suitable for sintered bodies having a complex shape which are formed by pressureless sintering or gas pressure sintering, although it is possible to impart conductivity to sialon sintered bodies by adding carbides, nitrides, borides, or silicides of elements belonging to Groups IVa, Va, and VIa, as disclosed in the above-mentioned prior art.

According to the present invention, the sintered body should contain 23-70 vol % of Ti carbide, Ti nitride, or Ti carbonitride. With an amount less than 23 vol %, there is not enough to produce an electrical conducting path by the mutual contact of their particles and hence the sintered body does not have the desired conductivity. With an amount in excess of 70 vol %, they impair the oxidation resistance and high strength inherent in β-type sialon.

The present invention is based on the finding that yttrium oxide among sintering auxiliaries (including alumina and alumina nitride) has the greatest influence on the oxidation resistance of the sintered body of conductive sialon, and that the amount of yttrium oxide is closely related to the durability of the sintered body of conductive sialon in use at high temperatures. According to the present invention, the content of $Y_2O_3$ should be less than 5 wt %. With a content in excess of 5 wt %, $Y_2O_3$ is liable to cause expansion. However, with a content less than 1 wt %, $Y_2O_3$ does not fully exhibit its effect as a sintering auxiliary. Therefore, the preferred content of $Y_2O_3$ should be in the range of 1 to 4 wt %.

The sintered body of conductive sialon and the heating element made thereof in the present invention contain $Y_2O_3$ in an amount less than 5 wt %, so that they are free from expansion and cracking at high temperatures and hence have good durability. Incidentally, $Y_2O_3$ has no adverse effect on the flexural strength and resistivity regardless of its amount below 5 wt %.

BEST MODE FOR CARRYING OUT THE INVENTION

Example 1

Five specimens (Nos. 1 to 5) and one comparative specimen of sintered bodies of conductive sialon were prepared from respective powder mixtures. Each mixture was prepared by compounding $Si_3N_4$, AlN polytype, and $Y_2O_3$ to give a base mixture according to the formulation shown in Table 1, adding $Al_2O_3$ in an amount of 5 wt % of the base mixture, and further adding TiN in an amount of 30 vol % of the entire mixture. The mixture of raw materials underwent CIP molding and the green body was sintered at 1600°-1900° C. in nitrogen at normal pressure. (Incidentally, the CIP molding may be replaced by press molding, injection molding, or slip casting. The sintered body may be subjected to HIP treatment for the improvement of characteristic properties.)

TABLE 1

| | unit: wt % | | |
|---|---|---|---|
| Specimen No. | $Si_3N_3$ | AlN polytype | $Y_2O_3$ |
| 1 | 95.3 | 3.2 | 1.5 |
| 2 | 94.8 | 3.2 | 2 |
| 3 | 93.9 | 3.1 | 3 |
| 4 | 92.9 | 3.1 | 4 |
| 5 | 91.9 | 3.1 | 5 |
| Comparative | 90 | 3 | 7 |

Figure 1:
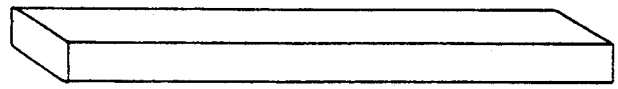
FIG. 1 is a perspective view showing the sintered body of conductive sialon pertaining to the present invention.
Figure 2:
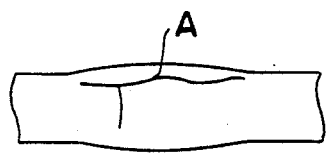
FIG. 2 is a sectional view showing expansion that occurs in a sintered body of conventional conductive sialon.
Figure 3:
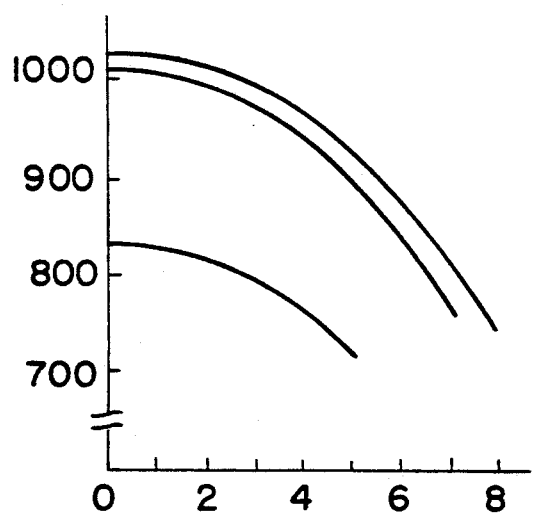
FIG. 3 is a graph showing the temperatures at various places in the sintered body of conductive sialon.
Figure 4:
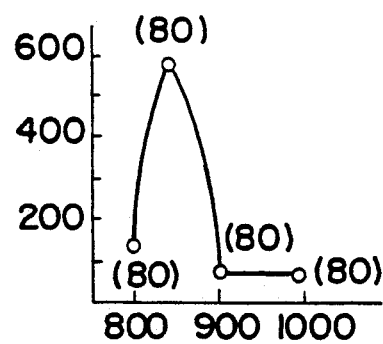
FIG. 4 is a graph showing the thickness of the oxidation layer which occurs when the sintered body of conductive sialon is heated at varied temperatures.

Each sintered body was fabricated into a rectangular plate measuring 20 mm long, 2.6 mm wide, and 1.5 mm thick, as shown in FIG. 1.

The thus prepared specimens were heated in a heating furnace at 850° C. for 80 hours. The heating formed an oxidation layer on the surface of each specimen. The thickness of the oxidation layer was measured. The results are shown in FIG. 5.

Figure 5:
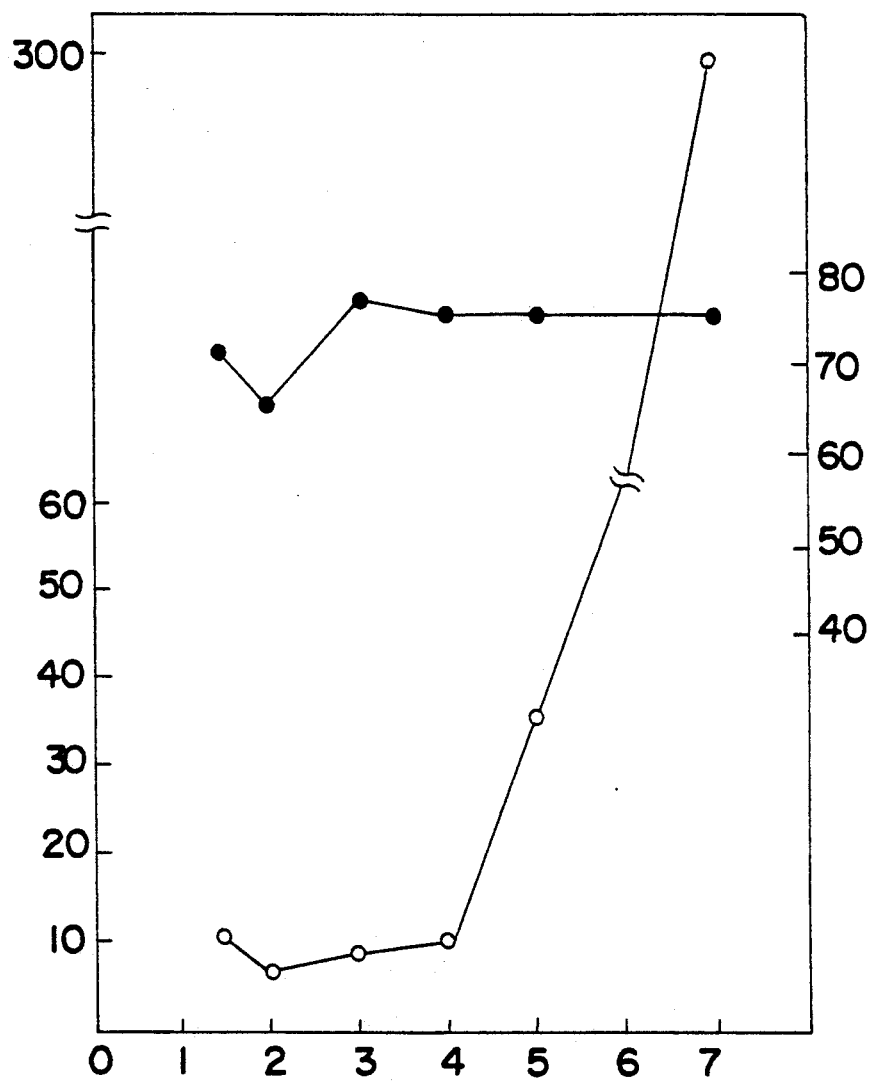
FIG. 5 is a graph in which the thickness of the oxidation layer and the flexural strength are plotted against the content of $Y_2O_3$.

It is noted from FIG. 5 that the oxidation layer is very thick when the content of $Y_2O_3$ exceeds 5 wt %. In other words, the sintered body has high oxidation resistance and is relieved from expansion if it contains less than 5 wt % of $Y_2O_3$. With the $Y_2O_3$ content of 4 wt % or less, the oxidation layer is invariably about 10 μm thick and hence the sintered body has sufficient oxidation resistance.

In FIG. 5, the flexural strength is plotted against the content of $Y_2O_3$. It is noted from FIG. 5 that the content of $Y_2O_3$ has little to do with the flexural strength.

Figure 6:
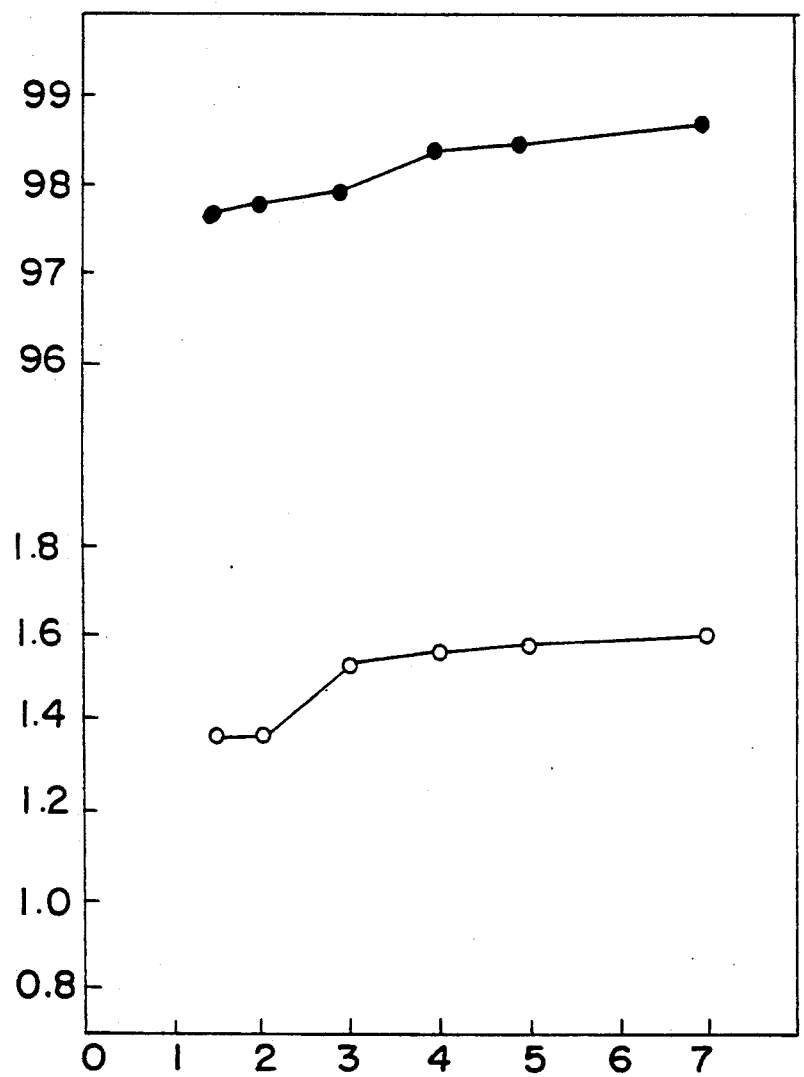
FIG. 6 is a graph in which the resistivity and density are plotted against the content of $Y_2O_3$.

In FIG. 6, the resistivity and relative density are plotted against content of $Y_2O_3$. It is noted from FIG. 6 that the content of $Y_2O_3$ has little to do with the resistivity and relative density.

The above-mentioned experimental results indicate that the sintered body of conductive sialon is not adversely affected in characteristic properties such as resistivity from the practical point of view, even though the content of $Y_2O_3$ is decreased to less than 5 wt % in order to improve the oxidation resistance of the sintered body and hence to protect it from expansion.

Example 2

Two specimens (Nos. 6 and 7) and one comparative specimen of sintered bodies of conductive sialon were prepared from respective powder mixtures. Each mixture was prepared by compounding $Si_3N_4$, AlN polytype, and $Y_2O_3$ to give a base mixture according to the formulation shown in Table 2, adding $Al_2O_3$ in an amount of 5 wt % of the base mixture, and further adding TiN in an amount of 30 vol % of the entire mixture. The mixtures of raw materials were molded and the green bodies were sintered in the same manner as in Example 1.

TABLE 2

| Specimen No. | unit: wt % | | |
|---|---|---|---|
| | $Si_3N_3$ | AlN polytype | $Y_2O_3$ |
| 6 | 93.9 | 3.1 | 3 |
| 7 | 91.9 | 3.1 | 5 |
| Comparative | 90 | 3 | 7 |

Each specimen of the sintered body was provided with electrodes. A voltage was applied continuously across the electrodes to keep the center of the sintered body at 1100° C. The time required for each specimen to be broken by oxidation and cracking was measured. The results are shown in Table 3.

TABLE 3

| Specimen No. | $Y_2O_3$ (wt %) | Durability (h) |
|---|---|---|
| 6 | 3 | ≧1000 |
| 7 | 5 | 500–700 |
| Comparative | 7 | ca. 100 |

It is noted from Table 3 that the specimens Nos. 6 and 7 are much more durable than the comparative specimen when the content of $Y_2O_3$ is 5 wt % or less. Resistance to expansion is significant when the content of $Y_2O_3$ is 3 wt %.

The specimens Nos. 6 and 7 and the comparative specimen were tested for durability in the following manner. Each specimen was heated by voltage application so that the temperature at the center of the specimen reached 1000° C. Each specimen was kept heated at this temperature for 30 seconds. Then the application of voltage was suspended for 60 seconds. The heating-cooling cycle was repeated until the specimen was broken. The results are shown in Table 4.

TABLE 4

| Specimen No. | $Y_2O_3$ (wt %) | Durability (cycles) |
|---|---|---|
| 6 | 3 | ≧120000 |
| 7 | 5 | ≧70000 |
| Comparative | 7 | ca. 15000 |

It is noted from Table 4 that the specimens Nos. 6 and 7 are much more durable than the comparative specimen when the content of $Y_2O_3$ is 5 wt % or less. Durability is sufficient when the content of $Y_2O_3$ is 3 wt %.

Example 3

Two specimens of sintered bodies were prepared in the same manner as in Example 2 according to the formulation for specimen No. 6, except that TiN was replaced by TiC and TiCN, respectively.

The specimens were tested for durability (expansion and heating-cooling) in the same manner as in Example 2. The results are almost the same as those of specimen No. 6 in Example 2.

CAPABILITY OF EXPLOITATION IN INDUSTRY

The sintered body of conductive sialon pertaining to the present invention is relieved from expansion. Therefore, it is hardly subject to cracking during use at high temperatures and hence is highly durable. In addition, it has desirable characteristic properties such as flexural strength and resistivity. The sintered body can be fabricated into heater elements of any shape. They will find use in cooking equipment, heating furnaces, thermostats, thermal fixing machines, and thermal transfer recording machines.

We claim:

1. A heater element which comprises a sintered element of conductive β-sialon and electrodes attached thereto, said sintered body of conductive sialon being one which is formed by sintering a mixture composed of (1) a base mixture containing $Si_3N_4$, a minor amount of AlN polytype, and 1–4 wt % of $Y_2O_3$, (2) a minor amount of $Al_2O_3$, and (3) 23–70 vol %, based on the base mixture, of at least one member selected from the group consisting Ti carbide, Ti nitride and Ti carbonitride.

* * * * *